July 7, 1959

J. S. BAIRD 2,893,159

FISHING HOOK STAND-OFF

Filed Jan. 25, 1957

INVENTOR.
JAMES S. BAIRD
BY
*Harry Sangeam*
*Huey Piker*
ATTORNEYS

United States Patent Office 2,893,159
Patented July 7, 1959

2,893,159

FISHING HOOK STAND-OFF

James S. Baird, Woodbury, N.J.

Application January 25, 1957, Serial No. 636,387

1 Claim. (Cl. 43—44.85)

My invention relates to a fishing rig and more particularly relates to a spreader or stand-off device for maintaining the fishhook leader separate from the fishing line itself.

Fishhooks are generally provided with a leader of flexible gut material which is secured directly to the fish line. However, it has been found that because of the flexible nature of the leader, the hook frequently becomes entangled with the line or engaged with an adjacent hook, to the consequent annoyance of the fisherman who has to reel in the line, untangle the hooks, and then make another cast. While other spreader devices are shown in the prior art, each utilizes a complicated structure for attachment to the fish line making them not only expensive, but also difficult to securely assembly upon the line and not permissive of freedom of attachment upon the line in a plurality of positions.

It is, therefore, an object of my invention to provide a stand-off device for fishhooks which will hold the baited hook away from the fishing line, thereby preventing snarling during casting or tangling and snagging of the hooks while submerged.

Another object of my invention is to provide a spreader device which will hold the baited hook away from the fishing line when submerged in order to allow the bait to wash with the water currents, thereby enabling the bait to assume its most natural condition.

Another object of my invention is to provide a stand-off device which may readily be attached upon any portion of the line by looping the line thereon in a few simple knots.

Another object of my invention is to provide a stand-off device which may readily be tied to or detached from the line at any position thereon without the need of any complicated securing devices.

Other objects of my invention are to provide an improved device of the character described, that is easily and economically produced, which is sturdy in construction, and which is highly effective in operation.

With the above and related objects in view, my invention consists in the details of construction and combination of parts, as will be more fully understood from the following description, when read in conjunction with the accompanying drawing, in which.

Referring now in greater detail to the drawing in which similar reference characters refer to similar parts, I show a fish-hook stand-off device, generally designated as A, which is adapted to be tied upon a fishing line, generally designated as B.

Figure 1:
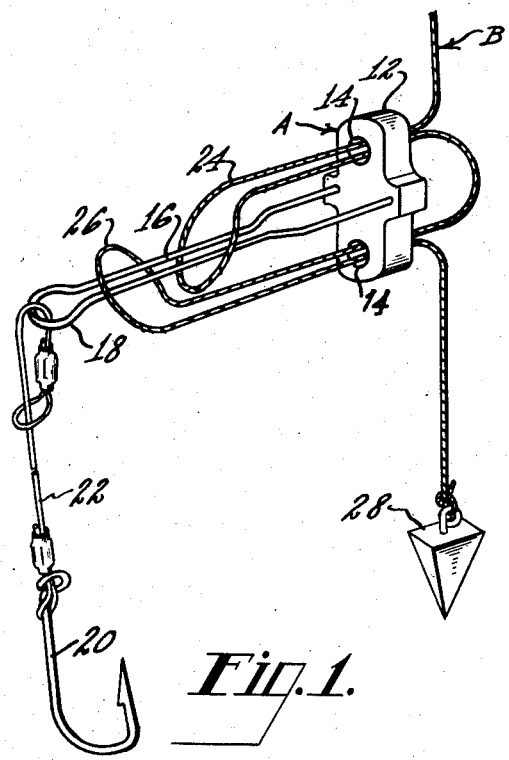
Fig. 1 is a perspective view of a fishhook stand-off device embodying my invention, illustrating its manner of attachment to a fishing line.

The stand-off device A comprises a base member 12 which is generally elongated in shape and has flat front and back faces thereon. The base member 12 has a plurality of apertures 14 axially spaced along the elongated axis thereof through which the fishing line B is adapted to be passed. Secured to the front face of the base 12 at right angles thereto intermediate the apertures 14 is a wire member 16 of generally U-shaped formation having a looped outer end 18 or eyelet to which the fishhook 20 is attached through its leader 22.

Figure 2:
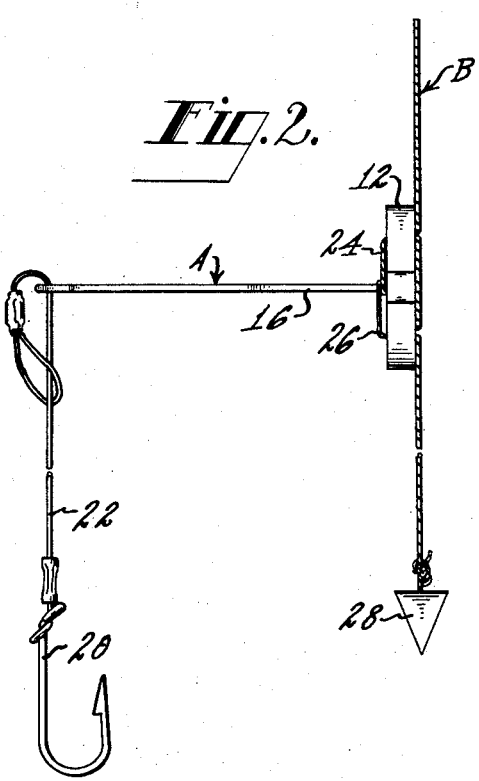
Fig. 2 is a side view of the attached stand-off device, in normal outstretched position.

As is easily seen from Fig. 1, a portion of the line B is doubled and passed through the upper aperture 14 to define a loop 24 which is extended about the closed end 18 and passed under the wire member 16. The lower portion of the line B is also doubled and passed through the lower aperture after which it is looped at 26 over and above the wire member 16. Pulling the ends of the line B taut will cause the loops 24 and 26 to tighten securely whereby the wire member 16 will project at right angles to the direction of the line. The hook 20 with its leader 22 is looped about the closed end 18 and attached thereon in a conventional fashion through the leader eyelet. A conventional sinker 28 is tied to the free end of the line B enabling the line to be retained taut during casting or when submerged whereby the stand-off is extended at right angles to the line and the hook is maintained in spaced relationship from the line to prevent it from becoming snarled thereon. See Fig. 2. In order to release the stand-off from the line, the loops 24 and 26 are passed over the closed end 18 of the member 16 after the hook has been removed.

Figure 3:
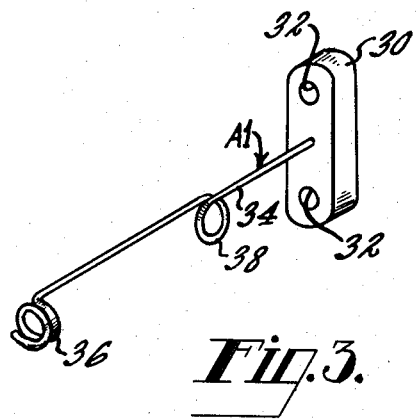
Fig. 3 is a perspective view of a modification of the stand-off device employing the attachment principles of my invention.

In Fig. 3, I show a stand-off modification A1, comprising a pedestal or base 30 having a pair of apertures 32 therein for passage of the line. A wire stem member 34 is secured to one face of the pedestal 30 at right angles thereto and has a pig-tail curl 36 at its outer end thereof for attachment of the hook by its leader. Intermeditae the curl 36 and the pedestal 30, the stem 34 is looped at 38 to provide resiliency and also to enable attachment of a second hook. The manner of attaching the stand-off modification A1 to the line B is identical to that of the stand-off device A.

Although my invention has been described in considerable detail, such description is intended as being illustrative rather than limiting, since the invention may be variously embodied, and the scope of the invention is to be determined as claimed.

I claim:

A fishing rig for mounting a fish hook and leader comprising, a fish line, a weight attached to the bottom of the line to maintain the line in a substantially vertical position, an elongated vertically extending flat base member adapted to be secured to the line in parallel relation with the line, an extension member fixed to the midpoint of the base and extending substantially perpendicular to the base and line, said extension member comprising a piece of bent wire having a loop at the end thereof remote from the base member to receive the fish hook leader and spaced leg portions at the other end thereof embedded in said base member, and means defining a pair of axially spaced openings at opposite ends of said base with the axes of the openings extending parallel to said extension member and equally spaced above and below said extension member, said base member being secured to said line at a point spaced from said weight with the extension member positioned at right angles to the line by doubling the line in a loop at two spaced portions thereof and passing each double portion through a respective opening, each double portion being then looped over said extension member and the line drawn taut.

(References on following page)

References Cited in the file of this patent

UNITED STATES PATENTS

| | | |
|---|---|---|
| 575,205 | Breitstein | Jan. 12, 1897 |
| 1,047,654 | Klersy | Dec. 17, 1912 |
| 2,125,718 | Haag | Aug. 2, 1938 |
| 2,157,477 | Bulow | May 9, 1939 |
| 2,227,420 | Angenblick | Jan. 7, 1941 |
| 2,482,901 | Cianfrone | Sept. 27, 1949 |
| 2,569,312 | Holm | Sept. 25, 1951 |
| 2,727,331 | Feinberg | Dec. 20, 1955 |
| 2,763,955 | Mead | Sept. 25, 1956 |

FOREIGN PATENTS

| | | |
|---|---|---|
| 10,418 | Great Britain | 1899 |